United States Patent Office 2,970,237
Patented Jan. 31, 1961

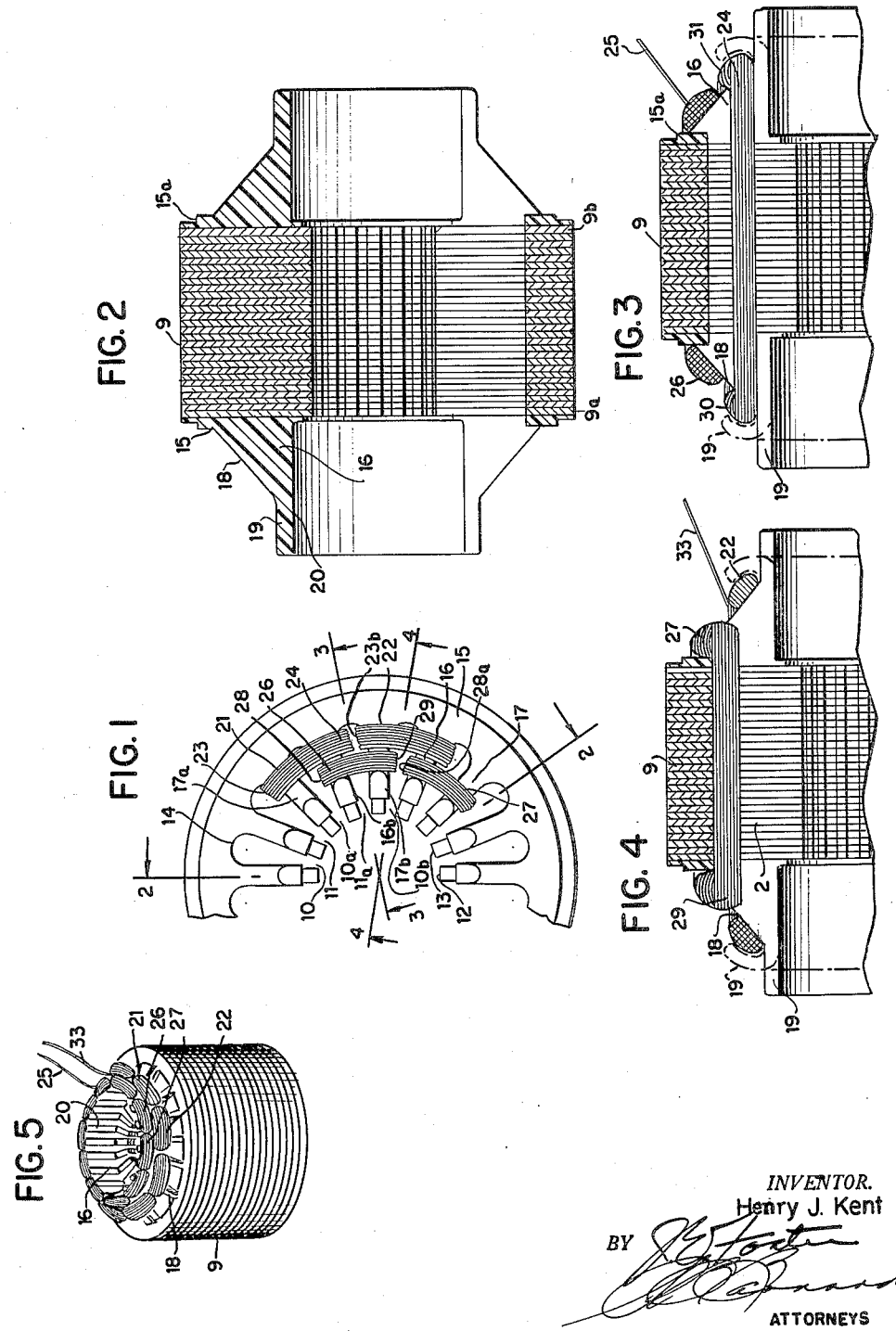

2,970,237

STATOR AND INTEGRAL COIL SUPPORT MEANS FOR PRECISION ELECTRICAL DEVICES

Henry J. Kent, West Englewood, N.J., assignor to General Precision, Inc., Wilmington, Del., a corporation of Delaware Filed Sept. 19, 1957, Ser. No. 684,987

2 Claims. (Cl. 310—260)

This invention relates to precision electrical components of the type used in servo-mechanisms and the like and is particularly directed to a stator construction which is utilized in servo motors, synchros, resolvers, and similar small devices.

Due to the extreme limitations in weight, size and precision required in the units which enter into precision servo-mechanism trains, the parts of the motor and other components are generally extremely delicate produced to a high degree of accuracy and consequently costly to produce.

The stator of these units which is made in a wide variety of configurations, depending upon the type of unit with which it is used, frequently consists of a series of laminations of circular outer contour, the laminations each having a plurality of radially positioned slots through the center thereof, the slots being utilized as means of locating and positioning a plurality of parallel sided coils which are located within the slots, and supported by the teeth between the slots, the number of coils, and the location and configuration of individual coils depending upon the type and size of the unit with which they are used.

As the coils are generally formed of a very fine wire, with an extremely light coating of insulating material deposited thereon, and as a plurality of coils are wound in an interconnected manner of a single length of wire, the winding and positionnig of the coils in their respective locations on the stator, is of necessity a delicate and costly process.

In the general manufacturing practice, the coils of a winding are usually individually and consecutively wound as part of a single length of wire, each coil having the required number of turns. The individual coils are manually inserted in the required slots in a predetermined arrangement through the assembled laminations.

In order to meet the necessary electrical characteristics of the unit in which the stator is used, it is essential that the overall length of wire forming each coil be held relatively uniform in order to maintain uniform resistance of the coils, in the groupings in which they are combined.

This necessitates uniform winding of the coils, and the maintenance of substantially uniform dimensions and configurations in order to avoid excessive variations in the resistance of groups of coils.

In inserting the sides of the coil in the required slots through the rotor laminations extreme care must be exercised by the operator, and the tools employed in pressing individual coils into the space required must be hand'ed with extreme care in order to avoid bending or nick:ng the wire in individual coils or disturbing the relatively thin insulation on each wire in order to minimize the possibility of a short circuit in a coil or between coils.

As the coils are assembled in various groupings and as the coils in each group are formed of a single length of wire, even a minor defect in a single coil or sections thereof necessitates the rejection of at least a complete group of coils formed of a single length of wire and in many cases the entire stator.

Due to the close proximity of the coils to one another in an individual stator it is extremely difficult to remove a defective group of coils without disturbing the other coils in a stator, with the result that all of the windings in a stator are frequently destroyed when a relatively minor defect occurs.

In order to reduce the costs of manufacture and minimize rejections it is therefore highly desirable, where possible, to employ automatic or semi-automatic machines for winding and locating the coils in the stator.

The use of a machine necessitates some type of end support and guide for each coil in order to retain the coil turns in position during the winding operation as the coil turns are accumulated.

Various expedients have been employed in providing such end supports, or horns, for individual coils, but due to the close relationship between the coils they present a rather delicate problem.

Removable horns of various types and configurations, and different methods of attachment to the body of the stator, have been employed in an effort to support the coils during the winding process. These have been found to be relatively unsatisfactory as the horns tend to shift during the winding of the coils. Moreover, the removal of the horns after winding each set of coils presents an extremely delicate problem since the movement of the horns tends to distort the wire in individual coils, or to scratch the insulation and possibly cause a rejection of the wound stator.

The primary object of my invention is to provide insulating end supports for both ends of each coil, which are primarily attached to the stator laminations and are so located relative to the coils as to permit winding of a plurality of layers of coils automatically, or semi-automatically, with the horns accurately supporting and aligning each coil in such a manner as to provide uniform lengths of wire in each coil or group of coils, and to so support and guide the coils as to provide a minimum of interference with the radially positioned layers of coils.

Another feature of the construction is that the horn assemblies attached to both ends of the stator are relatively simple and rigid, and formed of insulating material, the individual horns being of such configuration that they accurately support and guide the ends of the coils and direct them into their required positions in the stator, the outer contour of the horns being such as to retain the outer row or layer of coils in such a position as to permit the ready winding of the inner radially positioned layer of coils with a minimum of interference or possibility of coil damage, after the outer coils are wound.

Another feature of the construction is that each horn assembly serves as an insulation to separate and insulate ends of the coils supported thereby from the stator laminations to which they are attached.

Another feature of the construction is that the individual horns are made long enough to accurately support and guide the inner radial layer of coils during the winding thereof, without disturbing the outer layer of coils which is already in place.

Another feature of the construction is that the configuration and location of the horns is such as to permit staggering the inner layer of coils relative to the outer layer, without disturbing the individual coils, or the insulation therebetween.

Another feature of the construction is that it permits complete insulation of the outer layer of coils relative to the inner layer, either by inserting a pliable sheet of insulating material between individual coils, or by the introduction of a plastic coating which serves as an insulator between the adjacent ends of the two layers of coils.

Another feature of the invention is that the length and configurations of the horns permits variation in the diameter of the wire and in the number of turns in each coil while utilizing essentially the same horn assemblies.

A major feature of the horn construction is that, if desired, the projecting ends of the horns may be made longer than is required merely to accurately guide the inner layer of coils during the winding thereof, and then the projecting ends extending beyond the ends of the coil turns may be detached or bent around the coil ends after the coils are wound in place, in order to enable the overall length of the stator beyond the ends of the coils and the horns to stay within the limitations of the housing to which they are fitted.

The primary feature of applicant's stator construction is that it provides for more accurately and tightly wound coils, accurately supported and located, and insulated from one another at a sharply reduced cost, and with a reduced rejection rate, over that of stator assemblies assembled by the conventional manual method.

The accompanying drawings, illustrative of one embodiment of my invention, together with the description of its construction and the method of assembly, operation and utilization thereof, will serve to clarify further objects and advantages of my invention.

In the drawings:

Figure 1 represents a side elevation of the assembled stator, showing the core and one of the end plates fitted with integral horns attached thereto, and illustrates the relative position of the coils of the two separate phase windings fitted around the horns of the end plates through the core slots;

Figure 2 is a section through the core and end plates assembly shown in Figure 1, but with the windings omitted, taken on the line 2—2, Figure 1;

Figure 3 is a section through one of the radial slots through the core and end plates shown in Figure 1, the section being taken through one of the outer coils, showing the relation between the ends of one outer and one inner coil, the tips of the horns being bent over in dot-dash lines to show the method of gripping the outer coils, and taken on the line 3—3, Figure 1;

Figure 4 is a section similar to Figure 3 through another of the radial slots through the core and end plates, the section being taken through one of the inner coils, showing the relation between the ends of the one inner coil and one outer coil, the tips of the horns at both ends being bent over in dot-dash lines, to show the method of gripping the ends of the outer coils, taken on the line 4—4, Figure 1; and Figure 5 is a schematic perspective view of the assembled stator, shown in Figs. 1–4, showing one of the end plates, the horns integral with the end plates, and the relative positions of the two sets of coil windings shown in Fig. 1.

It will be understood that the following description of the construction and the method of assembly and utilization of the stator and integral coil support means is intended as explanatory of the invention and not restrictive thereof.

In the drawings, the same reference numerals designate the same parts throughout the various views.

One embodiment of the stator construction shown in Figures 1, 2 and 3 comprises a core whose central body is composed of thin substantially circular magnetic laminations 9. Each lamination has a substantially circular bore surrounded by a series of symmetrically spaced substantially radial slots 10, 11 separated by teeth 12 and 13. For illustration, the sides of the teeth are substantially parallel to the radial centerline thereof, except for a flute or radius 14 near the outer end of each side of the tooth to receive wedges or other material to serve as locking keys to hold such material in the slot. The lamination teeth serve as supports for the sides of the coils which are located within the slots in a manner hereinafter described in greater detail.

A pair of end plates is attached to the ends of the core beyond the end laminations 9a and 9b, shown in Figure 2, each of the end plates which is molded of a plastic or other suitable insulating material, consisting of a relatively thin flat circular base 15, and 15a, the outer diameter of which is substantially equal to the outer diameter of the laminations 9. Each plate base 15 and 15a has a substantially circular opening through the center thereof, a plurality of substantially radial horns or projections 16 and 17 being integral with the outer surface of each base, the horns being substantially perpendicular to the base, and located substantially radially and equally spaced around the circumference of the circular opening through the base, the horns being in substantially longitudinal alignment with the radial teeth 12 and 13 extending radially inward on each of the laminations 9. The portion of the outer edge 18 of each of the horns located adjacent the base is angularly positioned relative to the longitudinal axis of the core, as shown in Figure 2, the angular portion serving as a support for the stator coils in a manner hereinafter described. The outer tip 19 of each of the horns is relatively narrow, the inner and outer radial edges thereof being substantially parallel to the longitudinal core axis. These tips 19 of the horns serve as a means for supporting the coils during the winding thereof, and may be broken off or otherwise detached from the body of each horn after the coil winding is completed, thereby to reduce the overall length of the wound stator. Where so desired, the tips of the horns may be utilized as a protective and anchoring elements to enfold the end-turns of the coils and to hold the end-turns of the coils and to hold the end-turns against displacement on the stator core during operation. Such use of the horn tips, folded over the end-turns, obviates the need for otherwise tying down the end-turns against casual and undesired displacement.

In order to facilitate attaching the bases of the end plates to the adjacent core laminations, the core laminations 9 may be placed in a mold and the two end plates with the horns 16 and 17 integral therewith molded in place of a suitable plastic material. This assures a positive bond between the end plates and the core laminations and positively locates the horns in accurate radial alignment with the teeth 12 and 13 of the laminations.

The end plates with the horns 16 and 17 integral therewith may be molded of a suitable thermosetting plastic material, the material being incompletely cured during the molding thereof, so that the horns are relatively soft, thus enabling the tips 19 of the horns to be bent over in an arcuate contour, as shown in dot-dash lines, to facilitate gripping the ends of the outer coils 21 and 22, as shown in Figures 2 and 3, thus avoiding the necessity for providing individual binders to retain the outer coils 21 and 22 in place.

The inner radial edge 20 of each of the horns is located radially outward beyond the central opening in each of the laminations 9, the inner edge being substantially parallel to the longitudinal core axis, thus providing larger central openings at the ends of the stator beyond the bases of the end plates thereof, than the central opening through the core laminations.

A series of parallel sided oval-shaped outer coils 21, 22 is located around a portion of the outer circumference of the horns adjoining the bases 15 and 15a each of the coils straddling two horns or projections 16 and 17, extending beyond the bases of the end plate 9, as shown in Figure 1. The longitudinal sides 23 and 24 of each of the outer coils which are substantially parallel to the longitudinal axis of the core are located within spaced radial slots 11 and 11a with a gap being left between the longitudinal sides 23b and 24 of adjacent coils as shown in Figure 1, to assure some separation and insulation of the sides of each coil from the sides of the adjacent coil.

The ends of each of the outer coils are located against and supported by the outer surfaces of the sloping outer edge 19 of a pair of horns 16b and 17a integral with each base plate, the outer edge of the horns serving as an inner support for the coil and serving to accurately locate the two ends of the coil, located adjacent the opposite bases 15 and 15a of the end plates.

The coils of each winding are wound of a continuous length of a relatively fine wire, covered with a thin layer of insulating material, thus providing insulation between turns in the same coil and between adjacent coils.

A short length or loop of wire is left between each consecutive pair of coils wound during the winding process.

After the coils are wound, all or some of the slack wire loops between successive coils may be cut, the individual strands 25 thus formed being connected in a suitable manner in order to maintain the coil distribution required in the operation of the stator.

The individual coils may be wound on a special winding machine, the turns of wire forming each coil being located in the positions shown in Figures 1 and 4, at the time of winding. The number of turns of wire in each coil are held uniform during the winding process. Moreover, it is essential that the length of the wire forming each of the coils be held to a relatively uniform length within fairly close limits, in order to maintain uniform resistance in each group of coils.

After the outer coils 21 and 22 are wound, the inner surfaces thereof, located around the horns 16 and 17 and the exposed surfaces of the longitudinal sides 23b and 24 of adjacent coils located within one of the radial slots 11a through the laminations are coated with a liquid plastic insulating material, to assure positive insulation between adjoining outer coils, and the adjoining surfaces of the outer coils and the inner coils 26 and 27 which are wound after the completion of the winding of the outer coils in a manner hereinafter described in greater detail.

In place of the plastic insulation, a series of connected longitudinal strips of relatively thin pliable plastic material may be inserted between adjoining sides of the outer coils 21 and 22 of the windings, the longitudinal strips being connected by integral cross-strips, at both ends thereof. The integral cross-strips may be inserted adjacent the inner surfaces of the ends of the outer coils, to separate and insulate the ends of the outer coils from the adjoining ends of the inner coils, thus positively insulating the inner coils from the adjacent outer coils.

While the plastic strip method is employed during the process in which previously wound coils are manually inserted into the slots which locate and guide them, the procedure is a very tedious and delicate one, as the individual strips are manually inserted between the adjoining teeth, using tools which are necessarily relatively thin in order to insert the strips into their required positions.

Unless these tools are used with extreme care, there is a marked tendency to either mar the insulation around individual wires, or to distort or kink the wires, thus causing the possibility of a short-circuit which may mean scrapping the entire stator.

After the outer coils are wound, the stator is returned to the coil winding machine and a series of similarly parallel sided oval-shaped inner coils wound around another pair of lamination inner teeth, the individual inner coils being staggered relative to the adjacent pairs of outer coils, so that the longitudinal sides 28 and 29 of each of the inner coils are inserted into a staggered pair of slots 10a and 10b, which are in radial alignment with the longitudinal centerlines of the adjoining pair of outer coils, each of the inner coils straddling the sides of an adjoining pair of horns or projections 16b and 17a extending beyond the end plate bases, opposite the sides on which adjoining outer coils are wound, as shown in Figure 1. The longitudinal sides 28 and 29, of each of the inner coils are substantially parallel to the longitudinal centerline of the core in the same manner as the outer coils.

A gap is left between the adjoining sides 28a and 29 of adjoining inner coils, as shown in Figure 1 in the same manner as the outer coils. As the width of the radial slots 10 and 11 is considerably narrower at the point of engagement with the sides of the inner coils, the number of individual turns forming the thickness of each side of each inner coil must be reduced in order to assure a positive gap between the sides of adjoining inner coils.

The left and right-hand ends 30 and 31, Figure 3, of each of the outer coils are located against and supported by the portion of the outer surface of the sloping outer edge of a pair of horns 16b and 17a, which straddle the slot 10a in which the gap between the sides of adjoining outer coils is located, the extreme portion of the ends of each inner coil extending outward to engage a portion of the parallel sided projecting tips of the adjoining horns 16b and 17a.

Thus the sloping outer edges of the horns 16 and 17 which extend longitudinally beyond the ends of the outer coils serve as a support for and accurately locate the inner coils in substantially the same manner as the outer coils are located.

The inner coils are also wound of a continuous length of fine wire in the same manner as the outer coils, a short piece of slack length or loop or wire being left between each pair of consecutively wound coils.

After the winding of the inner coils is completed, all or some of the slack wire loops between consecutive inner coils may be cut, the individual strand, 33 of each coil being connected to the required terminal in the same manner as those of the outer coils.

The inner coils are wound on the same machine as the outer coils, the turns of wire forming each inner coil being located substantially in the position shown in Figures 1 and 4 at the time of winding. The number of turns of wire in each inner coil is held uniform in order to obtain a uniform overall length and consequently uniform overall resistance in each group of inner coils, within the limits required of the overall stator.

After the inner coils are wound, the inner surface thereof, located around the horns 16b and 17b and the exposed surfaces of the longitudinal sides of adjacent inner coils located within one of the radial lamination slots 11 are coated with a liquid plastic insulating material in the same manner as the outer coils.

The number of radial slots in each of the core laminations may be varied to suit the requirements of the number of inner and outer coils required in a particular stator.

The contour and slope of the outer surface of each of the horns may be varied to provide the necessary room for the number of turns required in each of the inner and outer coils.

The length of the tips at the extreme ends of each of the horns is made long enough to support the outer coils during the winding process, the tips being bent over or detached after winding in order to reduce the overall length of the stator.

It will be apparent to those skilled in the art that my present invention is not limited to the specific details described above and shown in the drawings, and that various modifications are possible in carrying out the features of the invention and the operation, assembly and method of utilization thereof, without departing from the spirit and scope of the appended claims.

What is claimed is:

1. A stator comprising a core body consisting of a stack of thin substantially circular laminations of a magnetizable material, each of said core laminations having a circular bore surrounded by a series of symmetrically spaced radially positioned integral teeth separated by radial slots, the sides of each of said radial teeth being substantially parallel to the radial centerline thereof, an end plate molded of a plastic material abutting the outer surface of each end lamination of the core, each of said end plates having a circular base with a substantially circular central opening therethrough attached to the adjacent end core lamination, and having a plurality of integral radially positioned horns extending outward beyond each end plate base, the horns being substantially radially aligned with the radial teeth of the core laminations and located substantially perpendicularly to the end plate base, the inner radial edge of each of said horns being substantially parallel to the longitudinal axis of the core body, each of said horns having a tip integral with the longitudinal outer end thereof, the outer radial edge of each of said horn tips being substantially parallel to the inner radial edge of the horn of which it forms a part, a plurality of parallel-sided oval-shaped outer coils fitted to said stator core, each end of said outer coils straddling a pair of horns on the adjacent end plate, each side of each of said outer coils being fitted through one of the radial slots through the core laminations, and a plurality of parallel-sided oval-shaped inner coils fitted to said stator core, each end of said inner coils straddling a pair of horns on the adjacent end plate, the inner coils being staggered relative to the outer coils, each side of each of said inner coils being fitted through one of the radial slots through the core laminations, the adjacent sides of adjoining pairs of inner and outer coils fitted to preselected slots through the core laminations extending over close to the entire width of the slot to which they are fitted, with a relatively narrow gap between the sides of adjacent coils, the tips of each of said horns being operative to be bent over to retain the adjacent inner coil ends in place, the end plates being molded of an incompletely cured thermosetting plastic material, the tips of the horns remaining ductile to facilitate bending thereof after the inner and outer coils are in place.

2. A stator comprising a core body formed of a stack of thin substantially circular laminations of a magnetizable material, each of said laminations having a substantially circular central opening surrounded by a series of symmetrically spaced substantially radial integral teeth separated by radial slots, the sides of each of said teeth being substantially parallel to the radial centerline thereof, an end plate molded of a thermosetting plastic material abutting the outer surface of each end lamination of the core body, each of said end plates having a circular base with a substantially circular central opening therethrough, attached to the adjacent end lamination, the diameter of each end plate base being substantially equal to the diameter of the core laminations, each end plate having a plurality of integral radially positioned horns extending outward beyond the base thereof, the horns being substantially radially aligned with the radial teeth of the core laminations and located substantially perpendicularly to the end plate base, each of said horns having a tip integral therewith and extending longitudinally outward therefrom, the radial inner and outer edges of each of said horn tips being substantially parallel to one another, and to the longitudinal axis of the core, the outer radial edge of each of said horns being tapered convergingly toward the tip from its root, at the area of engagement with the base, a plurality of parallel-sided oval-shaped coils fitted to said stator core, each end of each of said coils straddling a pair of horns on the adjacent end plate, each side of each of said coils being fitted through one of the radial slots through the core laminations, the tips of each of said horns being operative to be bent over to retain the adjacent inner coil ends in place, the end plates being molded of an incompletely cured plastic material, the tips of the horns remaining ductile to facilitate bending thereof after the inner and outer coils are in place.

References Cited in the file of this patent

UNITED STATES PATENTS

| | | |
|---|---|---|
| 819,971 | Beck | May 8, 1906 |
| 1,803,493 | Volet | May 5, 1931 |
| 2,465,820 | Sharrow et al. | Mar. 29, 1949 |

FOREIGN PATENTS

| | | |
|---|---|---|
| 1,075,435 | France | Apr. 14, 1954 |
| 710,366 | Germany | Sept. 11, 1941 |